(12) United States Patent
Cho et al.

(10) Patent No.: US 6,993,197 B2
(45) Date of Patent: Jan. 31, 2006

(54) DEVICE AND METHOD FOR ENCODING DPCM IMAGE

(75) Inventors: Hyun Duk Cho, Kyonggi-do (KR); Alexandr L. Maiboroda, Petersberg (RU)

(73) Assignee: LG Electronics Inc., Seoul (KR)

( * ) Notice: Subject to any disclaimer, the term of this patent is extended or adjusted under 35 U.S.C. 154(b) by 713 days.

(21) Appl. No.: 10/013,824

(22) Filed: Dec. 13, 2001

(65) Prior Publication Data

US 2002/0118884 A1  Aug. 29, 2002

(30) Foreign Application Priority Data

Dec. 13, 2000  (KR) ................ 2000-75881

(51) Int. Cl.
 *G06K 9/36* (2006.01)
(52) U.S. Cl. .............. 382/238; 382/236; 382/240
(58) Field of Classification Search ........... 382/238, 382/236, 244, 251, 246, 254, 260, 264, 275, 382/240; 341/65; 358/470; 375/240.22, 375/240.13
See application file for complete search history.

(56) References Cited

U.S. PATENT DOCUMENTS

| | | | |
|---|---|---|---|
| 4,725,885 A | 2/1988 | Gonzales et al. | 358/135 |
| 4,933,761 A * | 6/1990 | Murakami et al. | 375/240.22 |
| 5,764,374 A * | 6/1998 | Seroussi et al. | 382/244 |
| 5,903,676 A | 5/1999 | Wu et al. | 382/244 |
| 6,041,145 A * | 3/2000 | Hayashi et al. | 382/268 |
| 6,289,131 B1 | 9/2001 | Ishikawa | 382/240 |
| 6,847,737 B1 * | 1/2005 | Kouri et al. | 382/260 |

FOREIGN PATENT DOCUMENTS

JP  362295586  * 12/1987

OTHER PUBLICATIONS

Jerome M. Shapiro, "Embedded Image Coding Using Zerotrees of Wavelet Coefficients", Dec. 1993, pp 3445-3462 IEE Transactions on Signal Processing, vol. 41 No. 12.

* cited by examiner

*Primary Examiner*—Anh Hong Do
(74) *Attorney, Agent, or Firm*—Fleshner & Kim, LLP

(57) ABSTRACT

Device for encoding a DPCM image is provided. A smoothness test is performed on an original image at a smoothness tester. A linearly predicted value of the original image is obtained at a linear predictor. A switching part operates depending on a result of the smoothness test. A difference between the linearly predicted value and the original image is quantized, and encoded when the result of the smoothness test is satisfactory. A difference between the linearly predicted value corrected by using space self-likeness of the image and the original image is quantized, and encoded when the result of the smoothness test is not satisfactory. The adaptive application of the existing linear prediction, and the prediction corrected by using self-likeness of space likeness of the image permits to obtain a better predicted value for DPCM, and improve an image compression efficiency.

24 Claims, 4 Drawing Sheets

DEVICE AND METHOD FOR ENCODING DPCM IMAGE

This application claims the benefit of the Korean Application No. P2000-75881 filed on Dec. 13, 2000, which is hereby incorporated by reference.

BACKGROUND OF THE INVENTION

1. Field of the Invention

The present invention relates to an image encoding device.

2. Background of the Related Art

H. 263, and MPEG4, methods for compression encoding of an image signal, encode motion vectors based on DPCM, i.e., encode a difference of a predicted value on the basis of pixel values that can be known at a decoder and the current pixel value through quantization procedure and VLC (Variable Length Coding) procedure. Accordingly, the image compression encoding on the basis of DPCM are divided into a part for obtaining the predicted value, a part for obtaining the difference of the predicted value and the current pixel value to be encoded, a part for quantizing the difference, and a part for variable length coding a quantized difference. Upon the image compression encoding on the basis of DPCM, the compression performance depends on how well the predicted value is obtained.

Conventional prediction methods are classified into a linear prediction method and a non-linear prediction method. The former method is in general a technique describing how different weighted values are given to linear combinations of adjacent pixels. A DPCM encoder based on the linear prediction method is quite effective in case of flat areas even if it apparently has a restricted efficiency due to the irregularity of signal. When it is assumed that information 'Z' is given, in the latter case, it is theoretically verified that a maximum prediction value to information 'Y' in view of minimum mean square is a conditional expectation value E(Y|Z) [R. Gray and A. Gersho, Vector quantization and signal decomposition, Kluwer Academic Press, 1992.]. However, since such a theoretical prediction method cannot be embodied practically, a non-linear prediction value cannot be actually obtained on the basis of the theory.

The conventional linear prediction method and the non-linear prediction method are based on characteristics, and proximity of adjacent pixels. However, it frequently appears that usage of proximity of adjacent pixels is appropriate on actual images starting from cases such as boundaries or lines. Therefore, the image compression encoding cannot be solved with the usage of proximity.

SUMMARY OF THE INVENTION

Accordingly, the present invention is directed to a DPCM based image encoding device that substantially obviates one or more of the problems due to limitations and disadvantages of the related art.

An object of the present invention is to provide an image encoding device which uses both a linear prediction method and a non-linear prediction method.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for encoding a DPCM image employs a linear prediction method as well as a non-linear prediction method using space self-likeness upon encoding of an image based on DPCM.

According to the configuration of the present invention, a smoothness test is performed in the vicinity of a pixel to be encoded from an original image. A linearly predicted value is used when the result of the smoothness test is satisfactory. A linearly predicted value corrected using space self-likeness of the original image is obtained when the result of the smoothness test is not satisfactory. Therefore, in this case, the corrected linearly predicted value is used for compression-encoding the original image.

Preferably, the present invention employs the space self-likeness searching method of a pool in obtaining the corrected predicted value by using the self-likeness of the original image.

As explained, by obtaining a better quality predicted value required for DPCM, and carrying out an image-encoding by using the predicted value, a compression efficiency is improved in the image-encoding, significantly.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
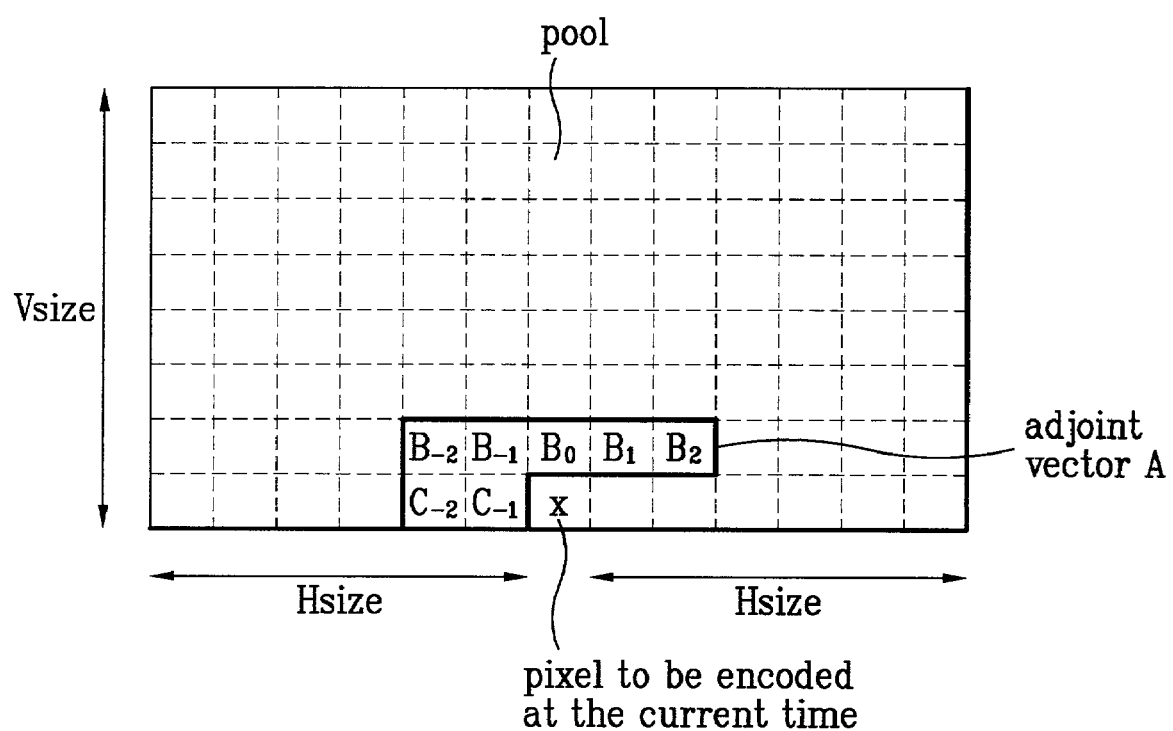
FIG. 1 illustrates a diagram explaining an adjacent vector of a pixel to be encoded at the current time and a pool.

Reference will now be made in detail to the preferred embodiments of the present invention, examples of which are illustrated in the accompanying drawings. FIG. 1 illustrates a diagram showing the adjacent vector of a pixel in a pool, which is subject to be encoded at the current time, provided for understanding the concept of the present invention.

Though the dimension and the structure of the joint vector may vary, in the preferred embodiment of the present invention, a vector expressed in the following equation (1) is taken into account.

$$A=[B_{-2},B_{-1},B_0,B_1,B_2,C_{-2},C_{-1}] \qquad (1)$$

Above equation (1) is not applicable to a case where the pixel 'x' is located on the boundary line of the image. In other words, the adjacent vector 'A' includes the pixels that are adjacent to X and are already encoded.

In the meantime, the adjacent vectors corresponding to the pixels of a particular region within the encoded pixel region will form a region, which is defined as a pool.

Referring to FIG. 1, the pool may have any size around X, and each pixel in the pool is correlated with one adjacent vector of the pixel. The pool size, Psize is expressed in the following equation (2).

$$Psize = 2 \cdot Hsize \cdot Vsize - Hsize + Vsize - 1 \qquad (2)$$

The pool will be used for predicting X based on the pool search of the present invention, to be explained later.

Figure 2:
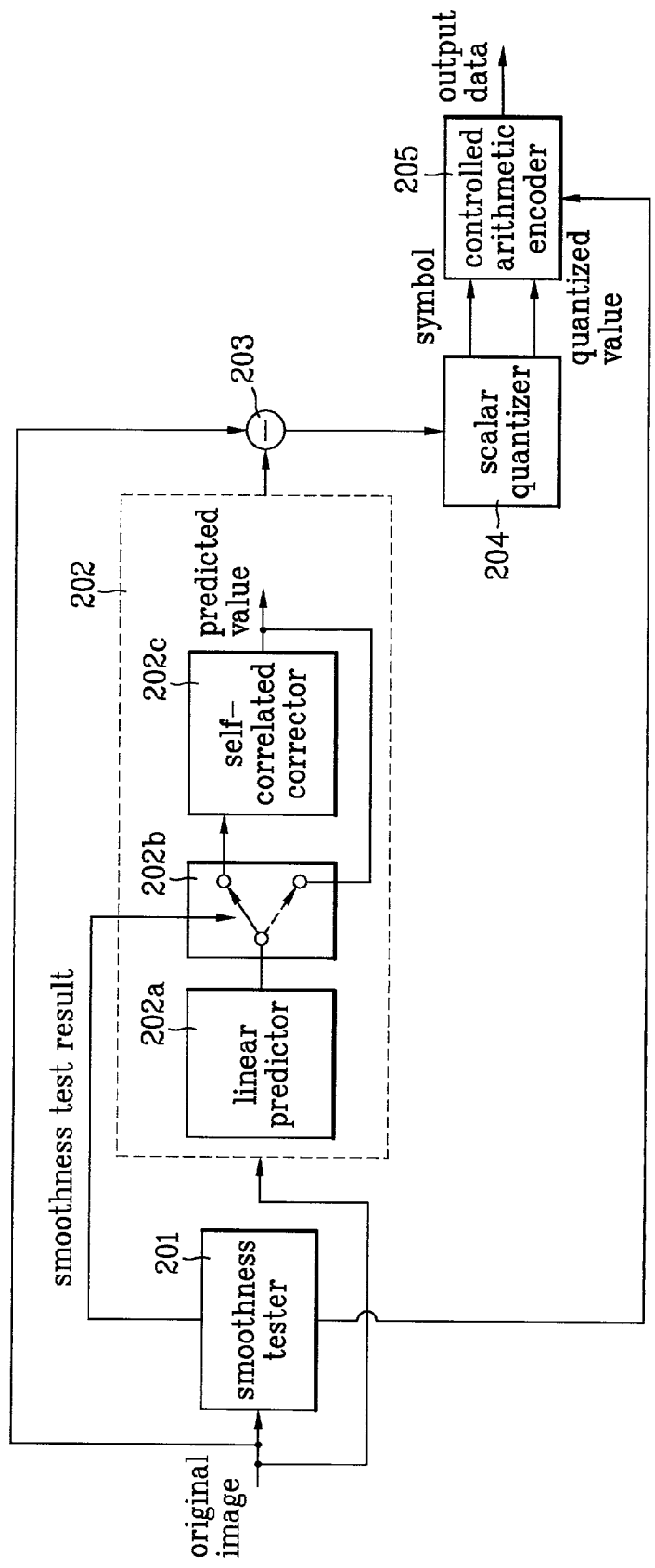
FIG. 2 illustrates a block diagram of a system of an image-encoding device in accordance with a preferred embodiment of the present invention.

FIG. 2 is a block diagram illustrating an image encoding device in accordance with a preferred embodiment of the present invention;

Referring to FIG. 2, the image encoding device includes a smoothness tester 201 for evaluating the smoothness of an original image, a self-correlated predictor 202 for predicting the value of a pixel, which is subject to be encoded, by using a self-likeness of the value of the pixel, a subtractor 203 for providing a difference value of the predicted value and the original image, a scalar quantizer 204 for quantizing the difference value generated from the subtractor 203, and a controlled arithmetic encoder 205 for encoding and forwarding the quantized difference value according to an output of the smoothness tester 201.

The smoothness tester 201 tests the smoothness of a part adjacent to the pixel 'x' to be encoded at the current time, and forwards the test result both to the self-correlated predictor 202 using the self-likeness, and the controlled arithmetic encoder 205.

The smoothness test depends on the result of comparison between the greatest absolute difference value of $C_{-1}$, and each element of the adjacent vector $A = [B_{-2}, B_{-1}, B_0, B_1, B_2, C_{-2}, C_{-1}]$ in the equation (1) and a preset threshold value Th. In other words, the comparison can be expressed as the following equation (3).

Where, $A_i$ denotes an (i)th element of the adjacent vector 'A', and the threshold value Th can be obtained from the following equation (4).

$$Th = 3.0 \cdot sqrt(Quant)(where 'Quant' \text{ denotes a quantizing parameter}) \qquad (4)$$

As explained, the self-correlated predictor 202 provides a predicted value $P_x$ by using the self-likeness of the image. The self-correlated predictor 202 may conduct a linear prediction first to obtain a linearly predicted value, and select and forward the linearly predicted value as a finally predicted value according to the result of smoothness test, because correction of the linearly predicted value in a smooth region is unnecessary. Or, the self-correlated predictor 202 may correct the linearly predicted value by using the self-likeness of the image and forward the linearly predicted value and the final predicted value.

The self-correlated predictor 202 includes a linear predictor 202a for making linear prediction of the pixel to be encoded at the current time by using adjacent pixel values, a switching part 202b for forwarding the linearly predicted value $P_l$ as the final predicted value or for switching to a correcting step before forwarding the linearly predicted value $P_l$ depending on the result of the smoothness test, and a self-correlated corrector 202c for correcting the linearly predicted value $P_l$ provided by the switching part 202b using a space self-likeness of the image and forwarding the corrected linearly predicted value as the finally predicted value.

Therefore, according to the prediction technique based on the self-likeness of the image in accordance with the present invention, the linear predictor 202a conducts a linear prediction of the original image by using adjacent pixel values of the pixel to be encoded at the current time and forwards the linearly predicted value $P_l$.

In this instance, as one of the linear prediction methods, an adaptive prediction technique may be used, in which four pixels $B_{-1}$, $B_0$, $B_1$, and $C_{-1}$ adjacented to the pixel 'x' are used as shown in the following equation (5).

$$P_l = f_0 \cdot C_{-1} + f_1 \cdot B_0 + f_2 \cdot B_{-1} + f_3 \cdot B_1 \qquad (5)$$

The value of fi depends on DVH, which is shown below.

$$DDVH = Dif\_V / Dif\_H, \qquad Dif\_V = |C_{-1} - B_{-1}|,$$
$$Dif\_H = |B_{-1} - B_0| \qquad (6)$$

That is, of the four adjacent pixels of the pixel 'x', the DVH is fixed as a ratio of an absolute value of a difference of the vertically adjacent pixels $C_{-1}$ and $B_{-1}$ to an absolute value of a difference of the horizontally adjacent pixels $B_{-1}$ and $B_0$. Then, $f_i$ is set as the following equations (7), (8), and (9) according to DVH for obtaining the predicted value $P_l$.

If DVH>1.5, $f_0=0.75$, $f_1=0.05$, $f_2=0.15$, $f_3=0.05$ \qquad (7)

If DVH<0.7, $f_0=0.15$, $f_1=0.55$, $f_2=0.15$, $f_3=0.15$ \qquad (8)

If DVH≦1.5, $f_0=0.75$, $f_1=-0.25$, $f_2=0.25$, $f_3=0.25$ \qquad (9)

The linearly predicted value $P_l$ obtained thus may be provided through a path set by the switching part 202b. The switching part 202b outputs the linearly predicted value $P_l$ as a finally predicted value, or it may send $P_l$ to the self-correlated corrector 202c according to a result of the smoothness test.

If it is determined that the vicinity of the pixel 'x' is smooth as the result of the smoothness test, the switching part 202b selects and forwards the linearly predicted value $P_l$ obtained from the linear predictor 202a as the finally predicted value.

However, if it is determined that the vicinity of the pixel 'x' is not smooth, the switching part 202b forwards the linearly predicted value $P_l$ obtained at the linear predictor 202a to the self-correlated corrector 202c. The self-correlated corrector 202c corrects the linearly predicted value $P_l$ by using the space self-likeness of the image and forwards as a final predicted value.

Referring to FIG. 2, the finally predicted value is provided from the self-correlated predictor 202 to the subtractor 203, and the subtractor 203 obtains a difference (or a prediction error) between the original image and the final predicted value and provides the difference to the scalar quantizer 204. The scalar quantizer 204 quantizes the prediction error and forwards the quantized value and the quantization symbol to the controlled arithmetic encoder 205. The controlled arithmetic encoder 205 encodes the symbols of the prediction errors and the quantized data according to the result of the smoothness test. In this instance, the controlled arithmetic encoder 205 may be a typical VLC.

As explained in association with FIG. 2, the preferred embodiment of the present invention suggests to select the linearly predicted value as the finally predicted value based on the smoothness test result, and the prediction error is obtained from the linearly predicted value, which is quantized and encoded.

In the meantime, the linearly predicted value may be corrected by using the self-likeness of the image according to the result of the smoothness test. The corrected linearly predicted value is selected as the finally predicted value, using which the prediction error value is obtained. The prediction error is also quantized and encoded.

Figure 3:
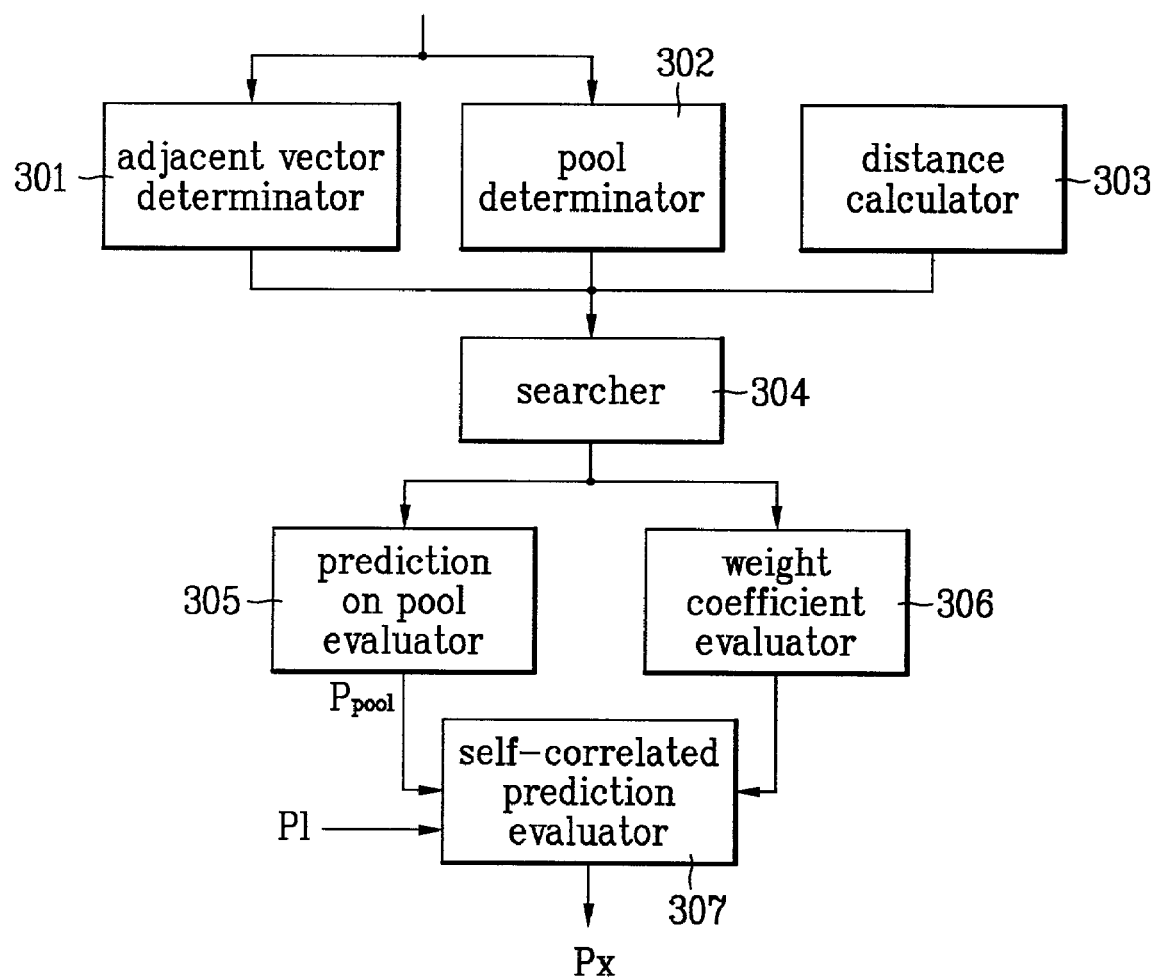
FIG. 3 illustrates a block diagram of a system of a self-correlated corrector in an image-encoding device of the present invention; and, FIG. 4 illustrates a diagram showing wavelet coefficients, and a tree structure.

FIG. 3 is a block diagram illustrating one embodiment of the self-correlated corrector 202c included in the image encoding device shown in FIG. 2 of the present invention.

Referring to FIG. 3, the self-correlated corrector 202c includes an adjacent vector determinator 301 for determining the adjacent vectors of a pixel to be encoded at the current time, a pool determinator 302 for determining the pool corresponding to the adjacent vectors of the pixels adjacent to the pixel to be encoded at the current time, a distance calculator 303 for providing distance information required for the vector search, a searcher 304 for searching the adjacent vectors being to the adjacent vector of the pixel to be encoded at the current time, a prediction on pool evaluator 305 for evaluating the prediction on pool to set a predicted value $P_{pool}$ by using the vector information searched by the searcher 304, a weight coefficient evaluator 306 for evaluating weight coefficients for determining the finally predicted value, and a self-correlated prediction evaluator 307 for providing the finally predicted value by evaluating the linearly predicted value $P_l$ and the predicted value $P_{pool}$ on pool using the weight coefficients.

The operation of the self-correlated corrector 202c will be explained in detail.

The adjacent vector determinator 301 determines an adjacent vector 'A' of the pixel 'x'. If it is a case of FIG. 1, the adjacent vector determinator 301 will determine $A=[B_{-2}, B_{-1}, B_0, B_1, B_2, C_{-2}, C_{-1}]$ as the adjacent vector 'A' of the pixel 'x'. Then, information on the determined adjacent vector is provided to the searcher 304.

The pool determiner 302 determines the pool explained in association with FIG. 1. As explained, the pool is a region formed by adjacent vectors of pixels located in the vicinity of the pixel 'x' to be encoded at the current time. That is, a region formed by adjacent vectors corresponding to each of the pixels in a particular region within a region of encoded pixels is defined as the pool. The pool determinator 302 determines this pool. According to FIG. 1, as explained, the size of the pool Psize is 2·Hsize·Vsize−Hsize+Vsize−1. The pool determinator provides information on the determined pool to the searcher 304.

The searcher 304 finds vectors being close to the adjacent vector 'A' of the pixel 'x' to be encoded among the adjacent vectors in the pool by using the pool information received from the pool determinator 302 and the adjacent vector 'A' information received from the adjacent vector determinator 301. The searcher 304 conducts the search by using the distance measurer defined at the distance calculator 303. The vectors searched at the searcher 304 are provided to the prediction on pool evaluator 305 and the weight coefficient evaluator 306.

The prediction on pool evaluator 305 provides the predicted value $P_{pool}$ based on pool search by using the result of search, and the weight coefficient evaluator 306 calculates the weight value for determining the finally predicted value by using the result of search. The weight coefficient evaluator 306 provides the calculated weight value to the self-correlated prediction evaluator 307.

The self-correlated prediction evaluator 30 generates the finally predicted value $P_x$ by using the linearly predicted value $P_l$, the predicted value $P_{pool}$ on pool, and the weight values.

The process for obtaining the predicted value $P_{pool}$ based on pool search, the process for determining the weight coefficient, and the process for calculating the finally predicted value $P_x$ from the predicted value $P_{pool}$, the weight coefficient, and the linearly predicted value $P_l$ will now be explained in detail.

The present invention basically suggests to utilize the self-likeness of an image for obtaining a good quality predicted value, particularly, in an image having a heavy contrast like a boundary or line. Therefore, in prediction of the current pixel, the present invention uses a few pixels adjacent to the current pixel, selected depending on self-likeness of adjacent vectors of the adjacent pixels and an adjacent vector of the current pixel.

Accordingly, a first step of the process for calculating the predicted value $P_{pool}$ based on pool search is to determine a pool of the adjacent vectors. Though the sizes of the adjacent vectors differ, an adjacent vector $A=[B_{-2}, B_{-1}, B_0, B_1, B_2, C_{-2}, C_{-1}]$ may be taken into consideration, and the size of the pool can be determined by using Psize=2·Hsize·Vsize−Hsize+Vsize−1. As one try, though the original image may be enlarged, to use a resolution of the enlarged image as the adjacent vector, this case requires a large amount of calculation.

As explained, the search of the vector being close to the adjacent vector 'A' that the adjacent vector determinator determines within the pool determined by the pool determinator 302 is a matter of self-likeness tolerance of the adjacent vector. Therefore, the definition of the scale for measuring the self-likeness of the adjacent vector is an important matter. In the present invention, the following weight norm is employed, that is a factor for determining the scale of self-likeness of the adjacent vector.

$$\|A\| = \sum_i n_i \cdot A_i^2 \qquad (10)$$

$$\|A\| = \sum_i m_i \cdot |A_i| \qquad (11)$$

'$A_i$' denotes each component of an adjacent vector A (for example, x-axis component, and y-axis component of the adjacent vector on two dimensional x-y coordinate), and $n_i$ and $m_i$ are weight coefficients. The weight coefficients are used because it may be considered that an adjacent vector has components that have different importances. For giving a weight value to each component corresponding to its respective importance, the weight coefficients are used. '$n_i$' and '$m_i$' are obtained from an experiment. While equation (10) renders a good result more or less, the equation (11) requires less amount of calculation.

In the meantime, the searcher 304 selects 'N' vectors being close to the adjacent vector 'A' of the pixel 'x' to be encoded from the adjacent vectors in the pool. That is, $A_1, A_2, A_3, \text{---}, A_N \in$ pool, and the corresponding pixel values $x_1, x_2, x_3, \text{---}, x_N$ are provided. The search result is provided to the prediction on pool evaluator 305, to provide the predicted value $P_{pool}$ based on pool search. The predicted value $P_{pool}$ based on pool search is obtained using the pixel values, whose adjacent vectors have a distance to the '$A_1$' less than a preset threshold value $T_{dist}$ among the pixel values $x_1, x_2, x_3, \text{---}, x_N$ for prediction.

The following equation (12) denotes the predicted value $P_{pool}$ based on pool search.

$$P_{pool} = \sum_{i=1}^{M} x_i \cdot t_i^M \qquad (12)$$

$M \leq N$ and 'M' denote a number of adjacent vectors each having a distance to the $A_1$ less than the threshold value $T_{dist}$ selected from the 'N' adjacent vectors provided from the searcher 304. $T_{dist}$ and $t_i^M$ are determined from experiments.

As explained, the predicted value $P_{pool}$ obtained thus is provided to the self-correlated prediction evaluator 307, and the self-correlated prediction evaluator 307 determines the finally predicted value $P_x$ using the weight values, the linearly predicted value $P_l$, and the predicted value $P_{pool}$ based on pool search.

The following equation (13) expresses the finally predicted value $P_x$.

$$P_x = W \cdot P_{pool} + (1-W) \cdot P_l \tag{13}$$

The weight value 'W', determined by the weight coefficient evaluator 306, depends on an average of absolute differences of the adjacent vector 'A' and the $A_1$ as shown in the following equation (14).

$$D_A = \|A - A_1\| \tag{14}$$

According to equation (14), the smaller the $D_A$, the greater weight value 'W' will be multiplied to the predicted value $P_{pool}$ based on pool search. For an example, the weight value can be obtained from the following equation (15).

$$W = 1/(1 + e \cdot D_A^2) \tag{15}$$

Where, 'e' is determined experimentally.

As explained in association with FIG. 2, the difference (or the prediction error) of the finally predicted value $P_x$ and the original image will be presented after being quantized and encoded.

Though the image encoding technique of the present invention has been explained by using one embodiment, it will be apparent to those skilled in the art that various modifications and variations can be made in the present invention without departing from the spirit or scope of the invention. For example, a linear prediction (or other prediction) other than the forgoing technique described earlier may be used, or the adjacent vectors may be provided differently, and the criteria for measuring the distance used in the search may be defined differently.

Moreover, a DPCM method in an image domain is described up to now. However, recently, a method for compressing the image in a transform domain after transformation of the image by using a particular transformation method is widely used. In general, since the related art linear predictor is not suitable to the transform domain, the traditional DPCM method has not been applied to the transform domain. However, owing to the non-linear characteristics, the present invention can be applied to the transform domain.

Figure 4:
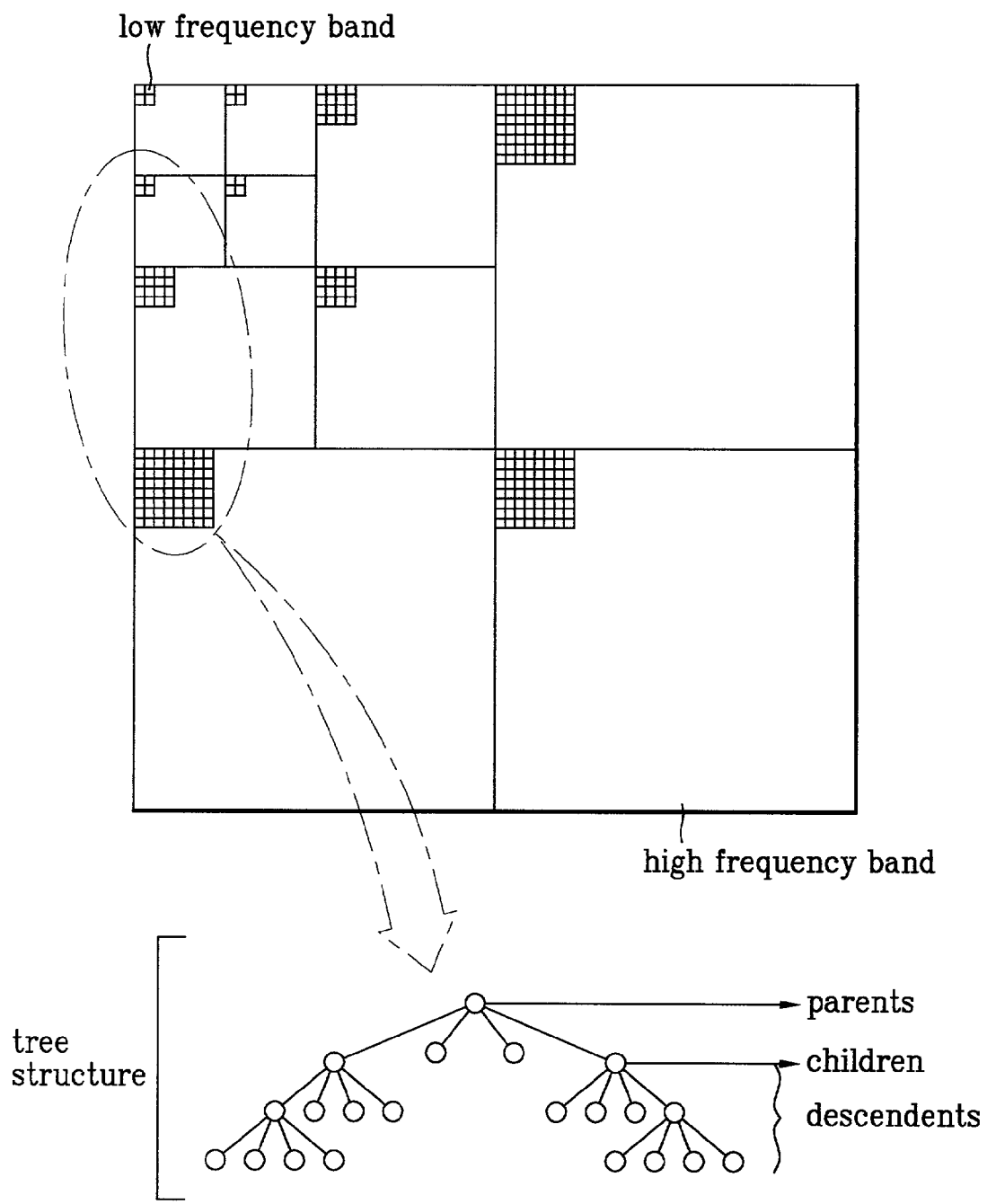

FIG. 4 shows one example. Among many transformation methods for image compression, a wavelet transformation technique is often used. When the image is subjected to the wavelet transformation, the image is divided into several regions representing different band frequencies ranging from a low frequency region to a high frequency region. These regions are called sub-band regions or band regions. Upon subjecting the image to a wavelet transformation, the low frequency region contains more meaningful information with respect to the original image.

As a method for making an effective compression of the band regions, the zero tree coding is widely known. The zero tree coding has succession of dominant path and subordinate path, of which detail is disclosed in 'J. M. Shapiro, "Embedded image coding using zero trees of wavelet coefficients," IEEE Trans. Signal Proc., 41(12): 3445–3462, Dec., 1993'.

In the present invention, the image is compressed on one dominant path and one subordinate path, and DPCM is conducted on the subordinate path. At first, the dominant path will be explained.

Referring to FIG. 4, when the image is transformed by the wavelet method, the wavelet coefficients are grouped in a tree structure. In the tree structure, top coefficients are called parents, coefficients at positions lower than the parents are called children, and coefficients at positions further lower than the children are called descendents, inclusive of the children.

The zero tree coding compresses the image based on the fact that if the parent coefficients have values smaller than a particular threshold value, there is a high possibility that all the descendent coefficients also have values smaller than the threshold value.

In other words, in comparison to a certain threshold value, if an absolute value of the wavelet coefficient is smaller, the coefficient is defined as zero, and, if the absolute value of the wavelet coefficient is greater, the coefficient is defined as non-zero. In this instance, transmission of position information on the non-zero coefficients is called the dominant path. Then, quantization of the non-zero coefficients is conducted, when the DPCM is applied.

In the meantime, in order to transmit the positions of the non-zero coefficients, the tree structure is used. Since it is highly possible that, if the parent coefficients are zero, the descendent coefficients are also zero, if a case is defined with only one symbol, when all the descendent coefficients are zero, inclusive of the parent coefficients, very great compression effect can be obtained.

Accordingly, in the zero tree coding, the position information of the non-zero coefficients are defined with three different symbols for the following three cases.

A first case is when the wavelet coefficient itself is a non-zero coefficient.

A second case is when only the wavelet coefficient itself is zero, and one of descendent coefficients is non-zero.

A third case is when all the wavelet coefficient itself, and its descendent coefficients are zero.

As explained, in general, the image is transmitted in forms of the three symbols by a method scanning the wavelet coefficients. As explained, when the dominant path having a succession of the three symbols comes to an end, the quantization is conducted after the DPCM is conducted for the non-zero values, when the zero value is restored to '0' at the decoder.

In the meantime, though the method of the DPCM carried out in the band region is the same with one carried out in the image domain, an effect of the linear predictor 202a may be insignificant because correlation of pixels in the band region is poor in comparison to the image domain, i.e., the band region is a transform domain.

Therefore, in order to obtain a weight value for DPCM to be carried out in the band region, the 'e' in equation (15) is replaced with a new value. Also, the equation (3), a scale for smoothness test, is modified to the following equation (16).

$$\max\_i(|A^*_i - A^*_j|) < Th, \text{ if } A^*_i \text{ and } A^*_j \text{ exist} \tag{16}$$

where, $A^*_i$ and $A^*_j$ denotes the adjacent vector A components, which are smaller than Th4zero, that is a threshold value for classifying the wavelet coefficients into zero or non-zero. That is, even if a coefficient to be subjected to DPCM is non-zero, if all adjacent coefficients required for the linear prediction are zero, it can be foreseen that the linear prediction yields '0', which at the end increases the prediction error.

Therefore, even if the criteria for the smoothness test is satisfied, if all the adjacent coefficients are zero, the linear prediction is not carried out, but the linear prediction correction process will be carried out.

The present invention can use a higher quality predicted value in the DPCM based image compression encoding.

The present invention can use the linearly predicted value, or a value obtained by correcting the linearly predicted value using a space self-likeness of the image selectively depending on the smoothness in the DPCM based image compression encoding.

Accordingly, the present invention permits to obtain a good quality predicted value, and improve an image-compression efficiency by utilizing the self-likeness of the image effectively, not only in a smooth area, but also in a complicated area, such as a strong boundary, or line.

It will be apparent to those skilled in the art that various modifications and variations can be made in device and method for encoding a DPCM image of the present invention without departing from the spirit or scope of the invention. Thus, it is intended that the present invention cover the modifications and variations of this invention provided they come within the scope of the appended claims and their equivalents.

What is claimed is:

1. A device for encoding a DPCM image comprising:
    a smoothness testing part for evaluating a smoothness in a vicinity of a pixel to be encoded at the current time;
    a prediction part for performing linear prediction, and prediction by using a self-likeness of an image, to an original image, to obtain a predicted value;
    a quantization part for quantizing a prediction error between the predicted value and the original image; and
    an encoding part for encoding the quantized information to arithmetic encoding depending on a result of the smoothness evaluation,
    wherein the smoothness evaluation of the smoothness testing part is performed by comparing absolute values of differences of adjacent vectors of the pixel to be encoded at the current time to a preset threshold value.

2. A device as claimed in claim 1, wherein the adjacent vector is defined as $A=[B_{-2}, B_{-1}, B_0, B_1, B_2, C_{-2}, C_{31\ 1}]$.

3. A device as claimed in claim 1, wherein the smoothness evaluation is executed by $\max\_i(|C_{-1}-A_i|)<Th$, where, $A_i$ denotes an (i)th element of the adjacent vector 'A', and the threshold value Th, being almost optimized, can be obtained from $Th=3.0 \cdot sqrt(Quant)$ (where 'Quant' denotes a quantization variable).

4. A device for encoding a DPCM image comprising:
    a smoothness testing part for evaluating a smoothness in the vicinity of a pixel to be encoded at the current time;
    a prediction part for performing linear prediction, and prediction by using self-likeness of an image, to an original image, to obtain a predicted value;
    a quantization part for quantizing a prediction error between the predicted value and the original image; and
    an encoding part for encoding the quantized information to arithmetic encoding depending on a result of the smoothness evaluation,
    wherein the prediction part includes;
        a linear prediction part for obtaining a linearly predicted value of the pixel to be encoded at the current time,
        a linear prediction value correction part for correcting the linearly predicted value using a self-likeness of an image, and
        a prediction value selection part for selecting one of the linearly predicted value and the corrected linearly predicted value as a finally predicted value depending on the result of the smoothness evaluation.

5. A device as claimed in claim 4, wherein, as a result of the smoothness evaluation, the predicted value selecting part is switched such that the corrected linearly predicted value is selected as the finally predicted value when the vicinity of the pixel to be encoded is not smooth, and the linearly predicted value is selected as the finally predicted value when the vicinity of the pixel to be encoded is smooth.

6. A device as claimed in claim 4, wherein the linearly predicted value correction part includes;
    an adjacent vector determination part for defining an adjacent vector of the pixel to be encoded at the current time,
    a pool determination part for defining a pool of adjacent vectors corresponding to pixels in the vicinity of the pixel to be encoded at the current time,
    a distance calculation part for evaluating the measure of proximity of the adjacent vectors,
    a search part for searching the adjacent vectors in the determined pool to find out nearest ones to the adjacent vector corresponding to the pixel to be encoded at the current time,
    a first determination part for determining a pool search predicted value based on pool search by using the adjacent vectors searched at the searching part,
    a weight value determination part for obtaining a required weight coefficient for determining the finally predicted value, and
    a second determination part for providing the finally predicted value taking the weight coefficient into consideration by using the linearly predicted value and the pool search predicted value.

7. A device as claimed in claim 6, wherein the pool has a size determined by $Psize=2 \cdot Hsize \cdot Vsize - Hsize + Vsize - 1$, where Hsize denotes a horizontal direction size, and Vsize denotes a vertical direction size.

8. A device as claimed in claim 6, wherein the distance calculation part employs the following weight norms for determining a criterion of self-likeness of the adjacent vector.

$$\|A\| = \sum_i n_i \cdot A_i^2,$$

$$\|A\| = \sum_i m_i \cdot |A_i|,$$

where, '$A_i$' denotes respective components of the adjacent vector 'A', and '$n_i$' and '$m_i$' are weight coefficients.

9. A device as claimed in claim 8, wherein '$A_i$' denotes an x-axis component, and a y-axis component on two dimensional x-y coordinate.

10. A device as claimed in claim 6, wherein the prediction value based on pool search is obtained by taking a pixel value corresponding to the nearest adjacent vector to the current adjacent vector among the pixel values predicted on the basis of the pool into prediction.

11. A device as claimed in claim 6, wherein the finally predicted value $P_x$ by the second determination part is determined by $P_x = W \cdot P_{pool} + (1-W) \cdot P_l$, where $P_{pool}$ denotes a prediction value based on pool search, $P_l$ denotes the linearly predicted value, and W denotes a weight value.

12. A device as claimed in claim 6, wherein the searching part provides 'N' vectors $(A_1, A_2, A_3, \text{---}, A_N \in \text{pool})$ which are close to the adjacent vector 'A' of the pixel 'x' to be encoded among the adjacent vectors of pixel values $x_1, x_2, x_3, \text{---}, x_N$ corresponding to the 'N' vectors.

13. A device as claimed in claim 6, wherein the prediction value based on pool search is obtained by $$P_{pool} = \sum_{i=1}^{M} x_i \cdot t_i^M,$$

where the prediction value $P_{pool}$ is one obtained by taking only pixel values corresponding to adjacent vectors having distances to the '$A_1$' smaller than a preset threshold value $T_{dist}$ into consideration among the pixel values $x_1, x_2, x_3, \text{---}, x_N$ for prediction, 'M' is a number of adjacent vectors having distances to the '$A_1$' smaller than the preset threshold value $T_{dist}$ among N adjacent vectors, $M \leq N$, and the $T_{dist}$ and the $t_i^M$ are determined experimentally.

14. A device as claimed in claim 12, wherein the weight value 'W' is dependent on an average of absolute values of differences of the adjacent vector 'A' and the $A_1$, and determined by $$D_A = \|A - A_1\|,$$

$$W = 1/(1 + e \cdot D_A^2),$$

where, 'e' is determined experimentally.

15. A device for encoding a DPCM image comprising:
a smoothness testing part for evaluating a smoothness in the vicinity of a pixel to be encoded at the current time;
a prediction part for performing linear prediction, and prediction by using self-likeness of an image, to an original image, to obtain a predicted value;
a quantization part for quantizing a prediction error between the predicted value and the original image; and
an encoding part for encoding the quantized information to arithmetic encoding depending on a result of the smoothness evaluation,
wherein the linear prediction of the original image, the prediction utilizing a self-likeness of the image, and the determination of the finally predicted value are made by performing zero-tree based encoding to wavelet coefficients, which are obtained by wavelet transforming the original image to zero tree basis encoding.

16. A device as claimed in claim 15, wherein the original image is compressed via one dominant path and one subordinate path, and the DPCM is executed via the subordinate path.

17. A device as claimed in claim 16, wherein the dominant path includes;
putting the wavelet coefficients, which are a result of wavelet transform of the image, into a tree structure,
in the tree structure, defining top coefficients as parents, coefficients at a position lower than the parents as children, and coefficients at lower positions including the children than the parents as descendents,
performing zero-tree coding to the wavelet coefficients in a manner that it is highly possible, if values of the parent coefficients smaller than a particular threshold value, all the descendent coefficients are also smaller than the threshold value wherein a wavelet coefficient is defined as zero if the absolute value of the wavelet coefficient is smaller than the threshold value, and the wavelet coefficient is defined as non-zero if the absolute value of the wavelet coefficient is greater than the threshold value, and
transmitting position information of the coefficients defined as non-zero.

18. A device as claimed in claim 17, wherein in the zero tree procedure the position information of the non-zero coefficients are transmitted in different three symbol forms in the zero tree coding according to the following three cases.
i) the wavelet coefficient own self is a non-zero coefficient,
ii) only the wavelet coefficient own self is zero, and at least one of descendent coefficients is non-zero, and
iii) all the wavelet coefficient own self, and the descendent coefficients are zero.

19. A device as claimed in claim 17, wherein the adjacent vector 'A' is defined as $A = [B_{-2}, B_{-1}, B_0, B_1, B_2, C_{-2}, C_{-1}]$.

20. A device as claimed in claim 19, wherein a criterion for the smoothness test of the wavelet coefficients is $\max\_i (|A^*_i - A^*_j|) < Th$, if $A^*_i$ and $A^*_j$ exist
where, $A^*_i$ and $A^*_j$ denotes the adjacent vector A components, which are smaller than Th4zero, that is a threshold value for classifying the wavelet coefficients into zero or non-zero.

21. A device for encoding an image comprising:
a smoothness testing part for evaluating a smoothness in a vicinity of a pixel of an original image to be encoded;
a prediction part for performing a linear prediction and obtaining a predicted value of the pixel;
a quantization part for quantizing a prediction error between the predicted value and the original image; and
an encoding part for encoding the quantized information to arithmetic encoding depending on a result of the smoothness evaluation,
wherein if the smoothness testing part determines the vicinity of the pixel x is smooth, the prediction part selects and forwards the obtained linearly predicted value as a finally predicted value, and if the smoothness testing part determines the vicinity of the pixel x is not smooth, the prediction part forwards the obtained linearly predicted value to self-correlated corrector to correct the linearly predicted value using a space self-likeness of the image and forwards the corrected value as the final predicted value.

22. A device as claimed in claim 21, wherein the smoothness evaluation of the smoothness testing part is performed by comparing absolute values of differences of adjacent vectors of the pixel to be encoded at the current time to a preset threshold value.

23. A device as claimed in claim 22, wherein the adjacent vector is defined as $A - [B_{-2}, B_{-1}, B_0, B_1, B_2, C_{-2}, C_{-1}]$.

24. A device as claimed in claim 22, wherein the smoothness evaluation is executed by $\max\_i(|C_{-1} - A_i|) < Th$, where, $A_i$ denotes an (i)th element of the adjacent vector 'A', and the threshold value Th, being almost optimized, can be obtained from $Th = 3.0 \cdot \text{sqrt}(Quant)$ (where 'Quant' denotes a quantization variable).

* * * * *